US005784083A

United States Patent [19]

Schumann et al.

[11] Patent Number: 5,784,083

[45] Date of Patent: Jul. 21, 1998

[54] INK JET PRINTER

[75] Inventors: Matthew Alexander Schumann; Anne Tregoning Miller; John William Teape, all of Cambridge, United Kingdom

[73] Assignee: Domino Printing Sciences, Plc, United Kingdom

[21] Appl. No.: 481,531

[22] PCT Filed: Jan. 7, 1994

[86] PCT No.: PCT/GB94/00155

§ 371 Date: Jul. 7, 1995

§ 102(e) Date: Jul. 7, 1995

[87] PCT Pub. No.: WO94/18010

PCT Pub. Date: Aug. 18, 1994

[30] Foreign Application Priority Data

Feb. 4, 1993 [GB] United Kingdom .................. 9302170

[51] Int. Cl.$^6$ .................. G01D 15/18

[52] U.S. Cl. .................. 347/54

[58] Field of Search .................. 347/54; 251/139, 251/141, 331, 85, 129.15, 129.2, 333; 118/313, 315

[56] References Cited

U.S. PATENT DOCUMENTS

| | | | |
|---|---|---|---|
| 4,336,544 | 6/1982 | Donald et al. . | |
| 4,415,910 | 11/1983 | Reece | 346/140 R |
| 4,576,111 | 3/1986 | Slomianny | 118/313 |
| 4,674,896 | 6/1987 | Yasunaga et al. . | |
| 4,737,802 | 4/1988 | Mielke | 346/140 R |
| 4,809,017 | 2/1989 | Fost | 346/75 |
| 4,875,058 | 10/1989 | Vonosek | 346/140 R |
| 4,924,241 | 5/1990 | Parks et al. | 346/75 |
| 5,126,755 | 6/1992 | Sharpe et al. . | |
| 5,139,226 | 8/1992 | Baldwin et al. | 202/129.2 |

FOREIGN PATENT DOCUMENTS

| | | |
|---|---|---|
| 0510648A2 | 10/1992 | European Pat. Off. . |
| 2441496 | 1/1976 | Germany . |
| 2192590A | 1/1988 | United Kingdom . |

OTHER PUBLICATIONS

Dot printer and Printing Method Thereof, vol. 8, No. 270 (M-344) (1707) Dec. 11, 1984.

*Primary Examiner*—Daniel P. Malley
*Attorney, Agent, or Firm*—Laff, Whitesel, Conte & Saret, Ltd.

[57] ABSTRACT

A printhead (1) for an ink jet printer includes a chamber (5) for containing marking fluid fed to the head in use. A plurality of orifices (8) open from the chamber (5), a marking fluid being emitted in use through the orifices (8). A corresponding plurality of actuators are provided. Each actuator comprises an arm (12) having at one end means for selectively opening and closing a respective orifice (8); a magnetic circuit (12, 13, 14, 15) of which the arm (12) forms a side; and one or more coils (14) for selectively inducing a magnetic flux in the circuit in order to move the arm (12) between a position in which it closes the respective orifice (8) and a position in which it opens the orifice (8).

8 Claims, 3 Drawing Sheets

INK JET PRINTER

The present invention relates to ink jet printers of the drop-on-demand type and, more particularly, to printheads for printers of this type.

In our GB-B-2134452, there is shown and described, a printhead in which a plurality of orifices are individually opened and closed by solenoid-actuated, wire-pulled closures. Locating the solenoids remote from the closures enables a fairly close spacing of the nozzles to be achieved. In the type of printhead shown in GB-B-2192590 (amongst others), which is a development of this system, individual nozzles are opened and closed by closure members on the end of rod-like magnetic armatures which are directly driven by respective coils. A problem with this design is that of nozzle spacing, resulting from the diameter of the coils/solenoids used to drive the armatures. If the solenoids are to be sufficiently strong and quick in pulling open the nozzles (hence of significant diameter) and if significant solenoid crosstalk is to be avoided (hence spaced well apart), then the nozzles cannot be located as closely as desired.

The present has the object, amongst others, of enabling a very close nozzle spacing to be achieved, without loss of opening power/speed.

According to the present invention there is provided a printhead for an ink jet printer, the printhead including a chamber for containing marking fluid fed to the head in use; a plurality of orifices opening from the chamber and through which a marking fluid can be emitted in use; and a corresponding plurality of actuators having means for selectively opening and closing a respective orifice, a magnetic circuit, and one or more coils for selectively inducing a magnetic flux in the circuit in order open the respective orifice, characterised in that each actuator comprising an arm having at one end the means for selectively opening and closing a respective orifice, the arm forming a side of the magnetic circuit, and the arm being moved between a position in which it closes and a position in which it opens the orifice.

The arm is moved by the induction of the magnetic flux between a position in which a gap is formed between part of the arm and the magnetic circuit and a position in which it closes the magnetic circuit.

Preferably, the arm is formed from spring steel and is mounted in cantilever fashion, flexing under the influence of the applied magnetic flux to open the orifice. The rest of the magnetic circuit is preferably substantially U-shaped.

The arm may vary in width, having a relatively narrow portion in order to provide suitable flexing characteristics, and a relatively wider portion in order to provide a low reluctance path in order to produce the desired degree of flux linking to the part of the circuit on the side of the arm adjacent the gap. A magnetic plate forming part of the magnetic circuit may extend over the narrower portion of the arm where the flexing chiefly occurs and partially over the wider portion in order to enable the required degree of flux linking between the portion of the circuit adjacent the fixed end of the arm and the wider portion of the arm.

In an alternative construction, the arm carries a magnetic plate which is attracted to the adjacent portions of the magnetic circuit on application of current to the coil or coils.

Preferably, the U-shaped portion of the circuit has a pair of coils, one mounted on each leg of the U. This enables adjacent actuators to be more closely spaced as each coil can be smaller in diameter than would be the case if a single coil were to be used and thus maximises copper volume thereby minimising copper losses.

The closeness of the orifices (which is dependent on the coil spacing) can also be improved by having the portion of the arm which closes the orifice extend beyond the leg of the U, so that, if adjacent actuators extend on opposite sides of the line of nozzles, the nozzles can be more closely located as the coils will be staggered and thus more closely "packed". The actuators may also be flared out from the nozzles to allow maximisation of coil diameter and to minimise spacing.

It is advantageous if the size of the gap between the leg of the circuit and the arm can be adjusted and this can be provided by allowing the leg to be moved axially, through the coil (if there is one) which surrounds it, relatively to the arm.

The adjustment of the leg may be provided by a rod movable relative to the remainder of the circuit or else by allowing the circuit to flex to accommodate such axial movement of the leg as is required.

An example of a printhead according to the present invention will now be described with reference to the accompanying drawings in which.

Figure 1:
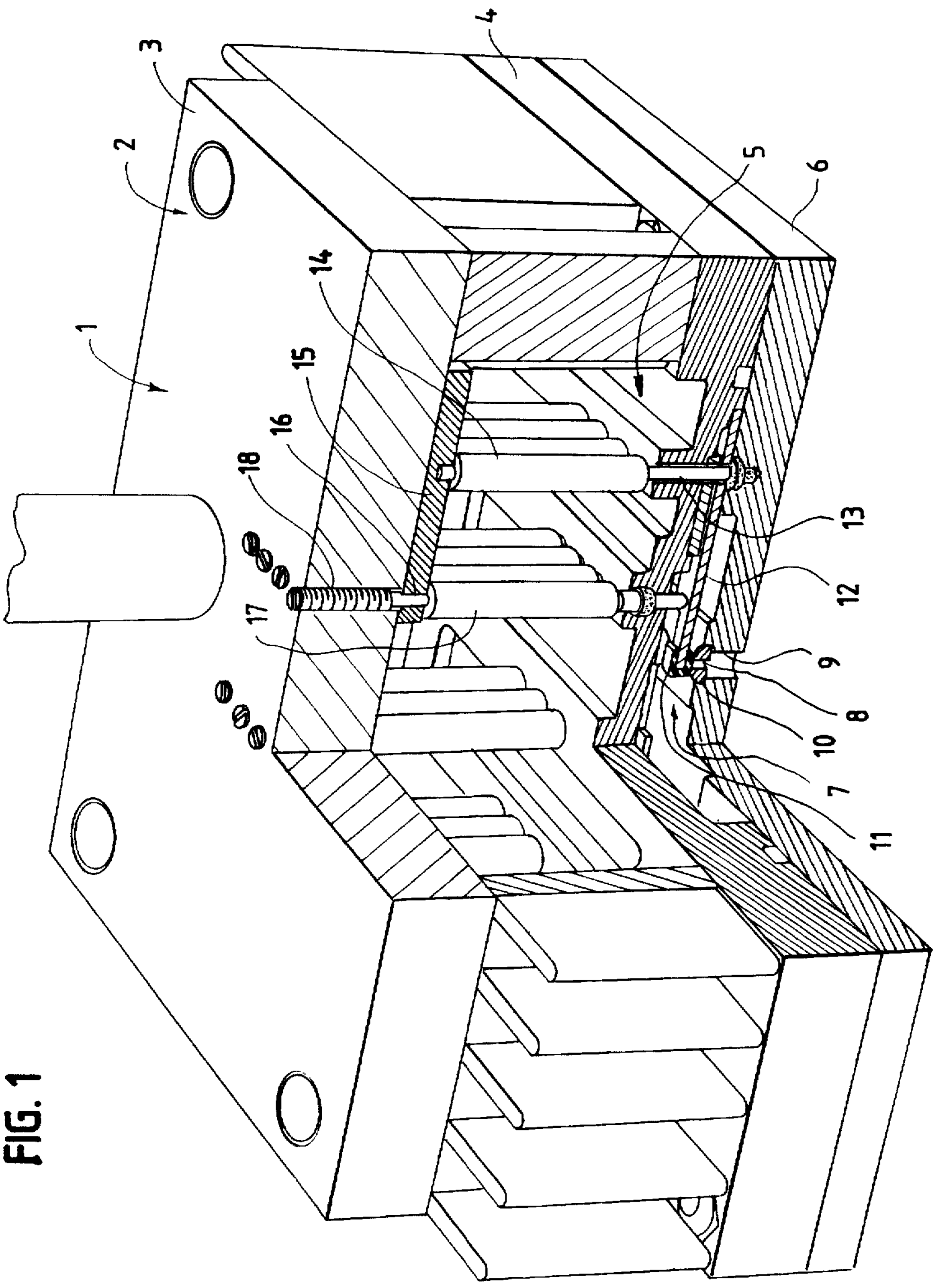
FIG. 1 is a partially cut-away isometric view through the printhead.

The printhead 1 comprises a body 2 which has a topplate 3 and a bottom plate 4. Between the plates 3 and 4 is defined a chamber 5 in which are located plural coils of plural actuators as will be described further below. A closure plate 6 is mounted on the bottom plate 4 and defines a chamber 7 to which a marking fluid such as ink is directed in use from a reservoir under pressure. A row of nozzles 8, each of which comprises a channel 9 in the cover plate 6 and an orificed jewel 10, allow ink to pass from the chamber for printing.

Closing each of the nozzles 8 is a synthetic rubber valve member or closure 11 which is mounted on the end of a spring steel, cantilevered, arm 12. Each arm 12 is held in a cantilevered position between the bottom plate 4 and cover plate 6 and is engaged at its fixed end by a magnetic core 13, around which is positioned a first coil 14. The end of the core 13 remote from the arm 12 is disposed in a flat magnetic plate 15 and, spaced from the first core 13, and passing through the magnetic plate 15, there is disposed a second core 16, around which is provided a second coil 17. Each core 16 has a screw-threaded portion 18 by means of which the axial position of the core 16 is adjustable within the chamber 5, the screw-threaded portion 18 engaging a corresponding screw thread in the top plate 3.

Figure 3:
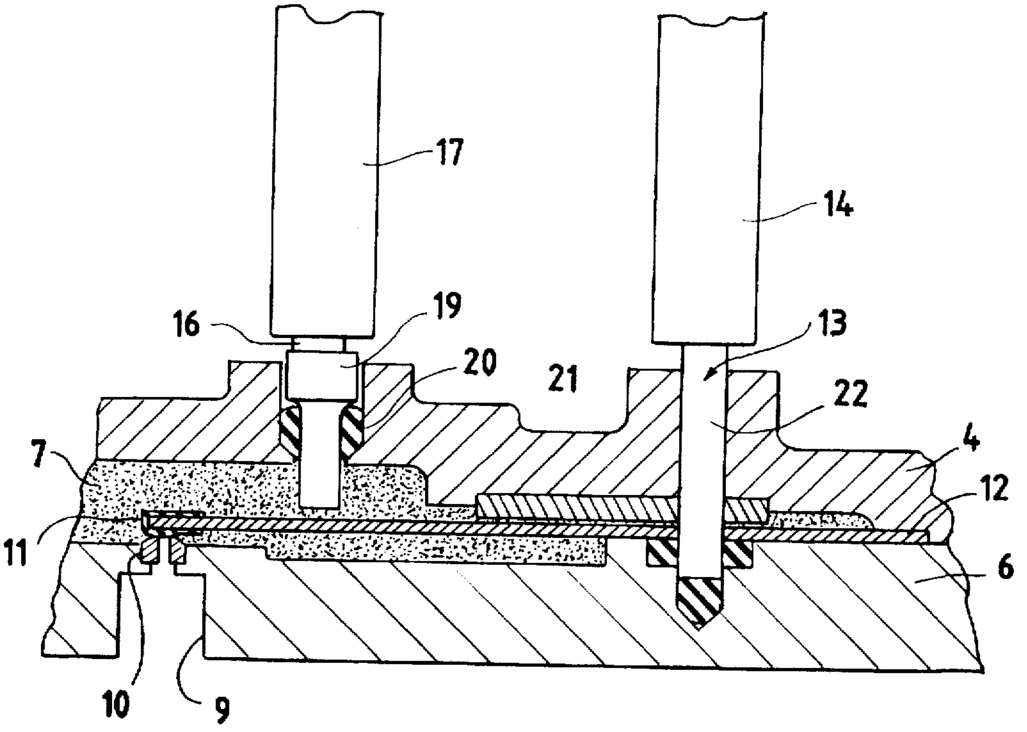
FIGS. 3 and 4 are cross-sections through the printhead showing an actuator in respectively closing and opening positions.

The end of the second core 16 remote from the screw thread 18 is disposed closely adjacent the arm 12 as is best seen in FIG. 3. The end of the core 16 is formed with a shaped portion 19 at the point at which the core 16 passes through the bottom plate 4 and into the chamber 7. This enables an O-ring 20 to seal the core 16 and thus avoid ink in the chamber 7 passing into the chamber 5. A second magnetic plate 21 is disposed closely around the end 22 of the core 13 and extends over the arm 12, closely spaced therefrom.

Figure 2:
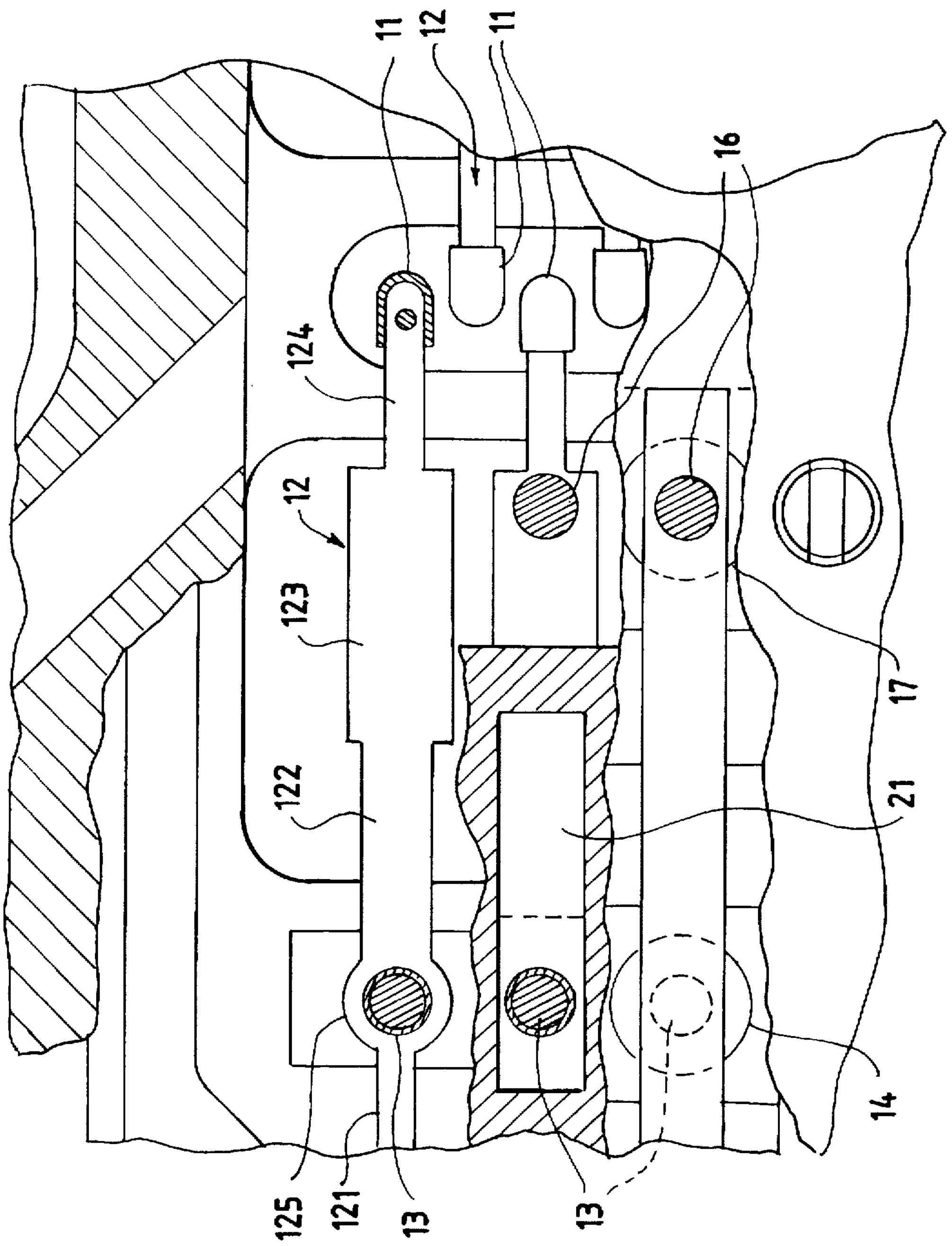
FIG. 2 is a complex planar section through the printhead.

As is best seen in FIG. 2, each of the arms 12 has a non-uniform width and has portions 121–124 of different width which will now be described.

The portion at 121 of the arm 12 remote from the respective nozzle 8 is the narrowest portion and extends into a part circular portion 125 which closely surrounds the first core 13. This in turn extends into a portion 122 which is the main area of flex of the arm 12 in use. This in turn extends into a wider portion 123 which in turn leads to a narrower portion 124 on the end of which the rubber closure member 11 is mounted over the nozzle 8. As is clearly illustrated in FIG. 2, the magnetic plate 21 overlies the flexing portion 122 of the arm 12 and partially overlies the wider portion 123. This enables magnetic flux in the circuit of the actuator (which is formed by the core 16, the magnetic plate 15, the core 13 and the plate 21 and arm 12) to link effectively between the remainder of the circuit and the arm 12, the required degree of flex thus not being reduced as would be the case if the portion 123 extended over the length of the arm 12.

Figure 4:
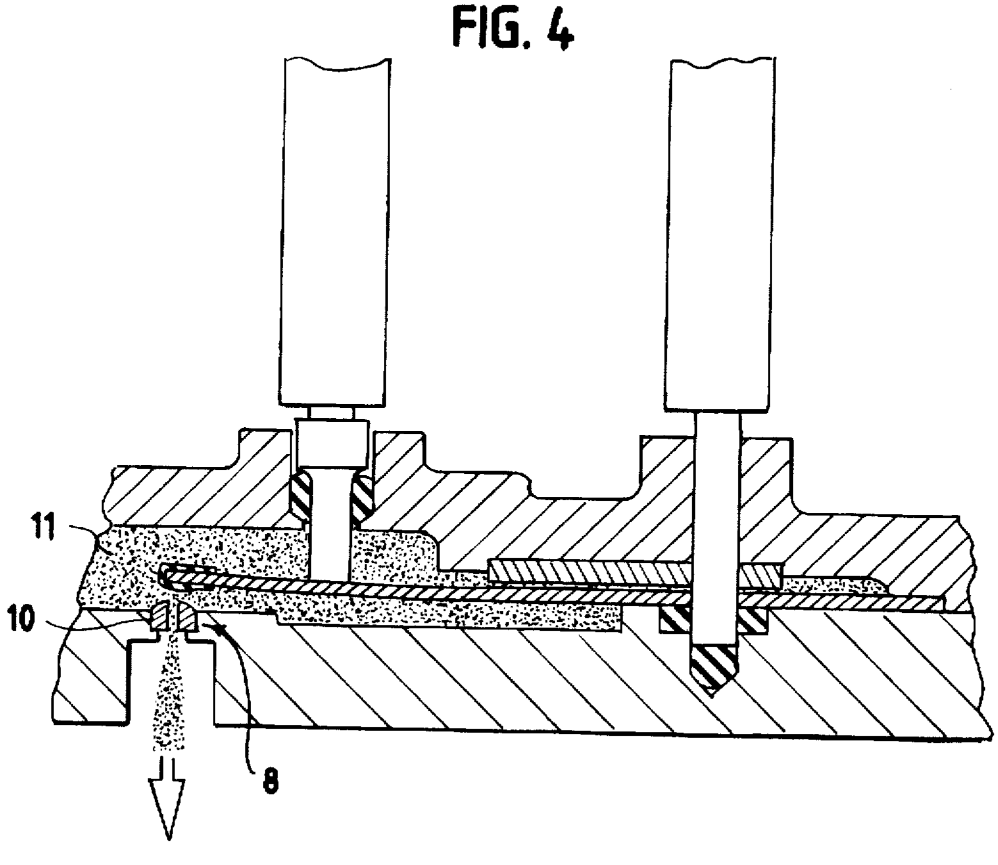

In use, when current is applied through the coils 14 and 17, the arm 12 is attracted towards the end of the core 16, lifting the closure 11 from the jewel 10 as shown in FIG. 4. Ink under pressure is then emitted as indicated in FIG. 4, through the nozzle 8, for printing.

As can be seen from FIGS. 1 and 2, adjacent nozzles 8 have respective arms 12 which extend in opposite directions, enabling the coils 14 and 17 of adjacent actuators on each side of the row of nozzles to be closely spaced and therefore enabling the nozzles themselves to be more closely spaced than would be the case if all the actuators extended from the same side of the row of nozzles. This increase in the "packing" density of the coils is further enhanced by providing split coils, i.e. two coils 14 and 17, one on each core 13, 16, rather than a single core, although in certain embodiments a single coil may be appropriate.

Adjustment of the axial position of the core 16 can be used to determine the degree of opening of the nozzle 8, but a separate back stop, not shown, may be provided, for example immediately behind the closure 11.

The dimensions of the chamber 7 may be carefully chosen, depending upon the physical properties of the marking fluid, to provide damping to the motion of the arm in use.

Although the example shows that the magnetic circuit of each actuator is formed from discreet components, the two cores 13,16, and the two magnetic plates 15 and 21, it is envisaged that a one-piece laminated component might be used in place of this, in which case the equivalent of the plate 15 may be allowed to flex to accommodate axial movement of the branch of the circuit closer to the nozzle, for adjustment of the opening and closing of the nozzle.

We claim:

1. A printhead for an ink jet printer, the printhead including a chamber for containing marking fluid fed to the head in use; a plurality of orifices opening from the chamber and through which a marking fluid can be emitted in use; and a corresponding plurality of actuators each having means for selectively opening and closing a respective orifice, a magnetic circuit, and one or more coils for inducing a magnetic flux, said magnetic flux to open the respective orifice, wherein each actuator comprises an arm having at one end the means for selectively opening and closing a respective orifice, the arm forming a side of the magnetic circuit and being mounted in cantilever fashion, flexing under the influence of the applied magnetic flux, and wherein the arm varies in width, having a relatively narrow portion in order to provide suitable flexing characteristics, and a relatively wider portion in order to provide a low reluctance path in order to produce a desired degree of flux linking to a part of the magnetic circuit not including the arm.

2. A printhead according to claim 1 wherein the arm is formed from steel.

3. A printhead according to claim 1 or claim 2, wherein a part of said magnetic circuit not including the arm is substantially U-shaped and comprises a pair of spaced apart, substantially parallel legs and a plate connecting the legs at their ends remote from the arm.

4. A printhead according to claim 1, further comprising a magnetic plate, forming part of the magnetic circuit, which extends over the narrower portion of the arm and partially over the wider portion in order to enable a required degree of flux linking between a portion of the magnetic circuit adjacent an end of the arm which is cantilevered and the wider portion of the arm.

5. A printhead according to claim 1, wherein the arm carries a magnetic plate which is attracted to a part of the magnetic circuit not including the arm on application of current to the coil or coils.

6. A printhead according to claim 3, wherein the U-shaped portion of the circuit has a pair of coils, one mounted on each leg of the U.

7. A printhead according to claim 3, wherein a portion of the arm which supports the means for closing the orifice extends beyond one of said legs of the U.

8. A printhead according to claim 7, wherein a gap is defined between said one leg and the arm, said gap being adjusted by axial movement of said one leg.

* * * * *